United States Patent
Zhang et al.

(10) Patent No.: US 12,540,182 B2
(45) Date of Patent: Feb. 3, 2026

(54) CHIMERIC ANTIGEN RECEPTOR, MACROPHAGE EXPRESSING SAME, METHOD FOR ADJUSTING MACROPHAGE POLARIZATION, AND USE THEREOF

(71) Applicant: ZHEJIANG UNIVERSITY, Hangzhou (CN)

(72) Inventors: Jin Zhang, Hangzhou (CN); Lin Tian, Hangzhou (CN); Anhua Lei, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 636 days.

(21) Appl. No.: 17/998,092

(22) PCT Filed: Oct. 22, 2020

(86) PCT No.: PCT/CN2020/122901
§ 371 (c)(1),
(2) Date: Nov. 7, 2022

(87) PCT Pub. No.: WO2021/223376
PCT Pub. Date: Nov. 11, 2021

(65) Prior Publication Data
US 2023/0227554 A1    Jul. 20, 2023

(30) Foreign Application Priority Data

May 8, 2020   (CN) .......................... 202010383935.8

(51) Int. Cl.
| | | |
|---|---|---|
| *C07K 14/57* | (2006.01) | |
| *C07K 16/28* | (2006.01) | |
| *C12N 5/00* | (2006.01) | |
| *C12N 5/0786* | (2010.01) | |

(52) U.S. Cl.
CPC .......... *C07K 16/2809* (2013.01); *C07K 14/57* (2013.01); *C07K 16/2815* (2013.01); *C07K 16/2818* (2013.01); *C12N 5/0645* (2013.01); *C07K 2317/622* (2013.01)

(58) Field of Classification Search
CPC ........................... C07K 16/2809; C07K 14/57; C07K 16/2815; C07K 16/2818; C07K 2317/622; C12N 5/0645
See application file for complete search history.

(56) References Cited

U.S. PATENT DOCUMENTS

| | | | | |
|---|---|---|---|---|
| 2003/0077249 A1* | 4/2003 | Bebbington | ............ | A61P 31/00 |
| | | | | 435/325 |
| 2017/0081405 A1* | 3/2017 | Adusumilli | ........ | A61K 40/4255 |

FOREIGN PATENT DOCUMENTS

| | | |
|---|---|---|
| CN | 107708741 A | 2/2018 |
| CN | 108715859 A | 10/2018 |
| CN | 109069597 A | 12/2018 |
| CN | 109266618 A | 1/2019 |
| CN | 109328074 A | 2/2019 |
| CN | 109952309 A | 6/2019 |
| CN | 110144327 A | 8/2019 |
| CN | 110305906 A | 10/2019 |
| CN | 110545883 A | 12/2019 |
| CN | 110615843 A | 12/2019 |
| CN | 111518219 A | 8/2020 |

OTHER PUBLICATIONS

Ren_et_al_Cancer_Immunol_Immunother_2015_vol. 64_pp. 1517-1529 (Year: 2015).*
Sun, Kang, et al. "Interferon regulatory factor 5 (IRF5) regulates the differentiation of bone marrow-derived macrophages in mice." with English abstract, Chinese journal of cellular and molecular immunology 33.2 (2017).
Liu, Wentai, "Cytokines", Medical Immunology, Jul. 31, 2017.
Sun, Kang et al, "Interferon Regulatory Factor 5(IRF5) Regulates the Differentiation of Bone Marrow-Derived Macrophages in Mice", China Doctoral Dissertations Full-text Database, Medicine and Health Sciences, Jan. 15, 2018, p. 2, part 1.3.

* cited by examiner

*Primary Examiner* — Catherine S Hibbert
(74) *Attorney, Agent, or Firm* — PERRY + CURRIER INC.

(57) ABSTRACT

Provided are a chimeric antigen receptor, a macrophage expressing same, a method for adjusting macrophage polarization, and the use thereof. The intracellular domain of the chimeric antigen receptor contains an IFN-γ receptor, and the macrophage expressing the chimeric antigen receptor can maintain an M1 type status for a relatively long time, thereby enhancing the activity of the macrophage M1 type after tumor cell antigens are combined with the chimeric antigen receptor.

3 Claims, 5 Drawing Sheets
Specification includes a Sequence Listing.

CHIMERIC ANTIGEN RECEPTOR, MACROPHAGE EXPRESSING SAME, METHOD FOR ADJUSTING MACROPHAGE POLARIZATION, AND USE THEREOF

CROSS-REFERENCE TO RELATED APPLICATIONS

The present disclosure claims the priority to the Chinese patent application filed with the Chinese Patent Office on May 8, 2020 with the filing No. CN202010383935.8, and entitled "CHIMERIC ANTIGEN RECEPTOR, MACROPHAGE EXPRESSING SAME, METHOD FOR ADJUSTING MACROPHAGE POLARIZATION, AND USE THEREOF", all the contents of which are incorporated herein by reference in entirety.

TECHNICAL FIELD

The present disclosure relates to the field of biotechnology, and particularly to a chimeric antigen receptor, a macrophage expressing same, a method for adjusting macrophage polarization, and the use thereof.

INCORPORATION BY REFERENCE

The sequence information contained in electronic file name: English Sequence Listing_PatentIn.txt; size 17 KB; created on: Nov. 28, 2022, is incorporated herein by reference in its entirety.

BACKGROUND ART

Macrophages (mø for short) are white blood cells located in tissues and are derived from mononuclear cells, while mononuclear cells are derived from precursor cells in bone marrow. Both macrophages and mononuclear cells are phagocytes, and participate in non-specific defense (congenital immunity) and specific defense (cellular immunity) in the body of vertebrates. The main function thereof is to perform phagocytosis (namely phagocytosis and digestion) on cell fragments and pathogens in the form of fixed or free cells, and to activate lymphocytes or other immune cells to make them respond to pathogens.

Macrophages form an important part of the congenital innate immunity and play a central role in the inflammation defense and host defense. In response to various environmental factors (such as microbiological products, injured cells, activated lymphocytes) or under different pathophysiological conditions, macrophages are transformed into different functional phenotypes, namely classically activated macrophages (M1) and alternatively activated macrophages (M2). Mature macrophages show phenotypic and morphological differentiation under various factors, namely polarization phenomenon of macrophages. According to different reactions to environmental stimulations, macrophages are mainly activated into two phenotypes, namely M1 and M2.

Around solid tumor tissues, macrophages account for more than a half of the number of tumor cells, which sufficiently explains that macrophages play an important role in tumor formation, proliferation, and metastasis. In a long-range tumor microenvironment, the M1 type is obtained through activation by signals such as IFN-γ and LPS or the like, mainly has antitumor and immuno-enhancing functions, and can secrete inflammatory factors, chemokines, effector molecules, and TNF-α or the like, wherein the membrane molecule CD80 or the surface marker CD64 or the like is representative. The M2 type is obtained through activation by factors such as IL-4 and IL-13, mainly has the potential to suppress immunoreaction, promote vasculogenesis, repair tissues, and promote tumor growth, and secretes more factors such as IL-10, TGF-β, or VEGF, wherein CD163 and CD206 are relatively highly expressed. After the antitumor effect in the preliminary stage (M1 macrophages), macrophages around tumor tissues are gradually transformed into M2 macrophages that promote tumor progression. Thus, how to utilize macrophages to adjust the tumor microenvironment for making them kept in M1 state and exert their natural immune cell functions and antigen presentation is essential for tumor immunotherapy.

In view of this, the present disclosure is specifically proposed.

SUMMARY

A first object of the present disclosure is to provide a chimeric antigen receptor, and immune cells expressing this chimeric antigen receptor have enhanced response capability to IFN-γ.

A second object of the present disclosure is to provide a method for adjusting macrophage polarization.

A third object of the present disclosure is to provide a macrophage expressing the chimeric antigen receptor.

A fourth object of the present disclosure is to provide the use of the chimeric antigen receptor or the method for adjusting macrophage polarization or the macrophage expressing the chimeric antigen receptor as described above.

To solve the above technical problems, following technical solution is particularly employed in the present disclosure.

According to an aspect of the present disclosure, the present disclosure provides a chimeric antigen receptor containing an IFN-γ receptor, wherein the IFN-γ receptor is located in an intracellular domain of the chimeric antigen receptor.

Optionally, the intracellular domain of the chimeric antigen receptor contains a costimulatory domain and an intracellular activation region, and the IFN-γ receptor is located in the intracellular activation region.

Optionally, the amino acid sequence of the IFN-γ receptor is shown by SEQ ID NO.2.

Optionally, the costimulatory domain contains at least one of 4-1BB, CD80, CD86, and CD28, and preferably contains 4-1BB, and the amino acid sequence of 4-1BB is shown by SEQ ID NO.3.

Optionally, the intracellular activation region further contains FcγRI or CD3ζ, and preferably contains CD3ζ, and the amino acid sequence of CD3ζ is preferably shown by SEQ ID NO.4.

Optionally, an extracellular domain of the chimeric antigen receptor contains scFv, Fab, scFab, or scIgG antibody fragments.

Optionally, the extracellular domain contains scFv.

Optionally, the scFv targets mesothelin.

Optionally, the amino acid sequence of the scFv targeting mesothelin is shown by SEQ ID NO.5.

Optionally, a transmembrane region of the chimeric antigen receptor contains CD8 or CD28, and preferably contains CD8, e.g., contains CD8α.

Optionally, the amino acid sequence of CD8α is shown by SEQ ID NO.6.

Optionally, the extracellular domain of the chimeric antigen receptor contains scFv targeting mesothelin; the transmembrane region contains CD8α; and the intracellular domain contains the costimulatory molecule 4-1BB, CD3ζ, and an IFN-γ receptor.

Optionally, the amino acid sequence of the chimeric antigen receptor is shown by SEQ ID NO.1, or shown by a sequence that is at least 90% or more homologous with a sequence shown by SEQ ID NO.1.

According to another aspect of the present disclosure, the present disclosure further provides a method for adjusting macrophage polarization, this method comprising: enabling macrophages to express the chimeric antigen receptor.

According to another aspect of the present disclosure, the present disclosure further provides a macrophage expressing the chimeric antigen receptor.

Optionally, the extracellular domain of the chimeric antigen receptor contains scFv targeting mesothelin; the transmembrane region contains CD8α; and the intracellular domain contains the costimulatory molecule 4-1BB, CD3ζ, and an IFN-γ receptor.

Optionally, the chimeric antigen receptor expressed by the macrophages is shown by SEQ ID NO.1, or shown by a sequence that is at least 90% or more homologous with a sequence shown by SEQ ID NO.1.

Optionally, the macrophages include macrophages derived from induction and differentiation of human induced pluripotent stem cells, or macrophages obtained through differentiation of human peripheral blood mononuclear cells.

According to another aspect of the present disclosure, the present disclosure further provides a nucleic acid encoding the chimeric antigen receptor.

According to another aspect of the present disclosure, the present disclosure further provides the use of the chimeric antigen receptor, the method for adjusting macrophage polarization, the macrophage expressing the chimeric antigen receptor, or the nucleic acid in the preparation of a product for treating the tumor.

According to another aspect of the present disclosure, the present disclosure further provides a product for tumor treatment, comprising the chimeric antigen receptor, the macrophage or the nucleic acid.

Compared with the prior art, the present disclosure has following beneficial effects.

It is difficult for macrophages only expressing a chimeric antigen receptor to keep the M1 state in a tumor microenvironment state for a long time, and in a non-M1 state, macrophages cannot stimulate the activity of killer T cells, such that the tumor microenvironment is continuously in an inhibitory state. As for the chimeric antigen receptor provided in the present disclosure, an IFN-γ receptor is inserted into an intracellular segment of the chimeric antigen receptor, the activation effect of IFN-γ against macrophages can be greatly enhanced, the response of macrophages to IFN-γ is enhanced, such that macrophages can keep the M1 state in vivo for a relatively long time, and the M1 activity of macrophages after the binding of tumor cell antigens to the chimeric antigen receptor is enhanced. At this time, M1 macrophages can stimulate the killer T cells to secrete more IFN-γ, and accordingly, the activated T cells can then stimulate macrophages to maintain the M1 state. Accordingly, the capabilities thereof for tumor phagocytosis and antigen presentation are exerted to the maximum extent, and T cells are activated, so as to sufficiently adjust the tumor microenvironment, such that the immunosuppressive state of the tumor microenvironment is changed eventually.

BRIEF DESCRIPTION OF DRAWINGS

In order to more clearly illustrate the technical solutions of the specific embodiments of the present disclosure or in the prior art, the accompanying drawings required to be used in the description of the specific embodiments or the prior art will be simply presented below. Clearly, the drawings described below show certain embodiments of the present disclosure, and for a person ordinarily skilled in the art, other drawings could also be obtained according to these drawings without using any creative efforts.

DETAILED DESCRIPTION OF EMBODIMENTS

Figure 1:
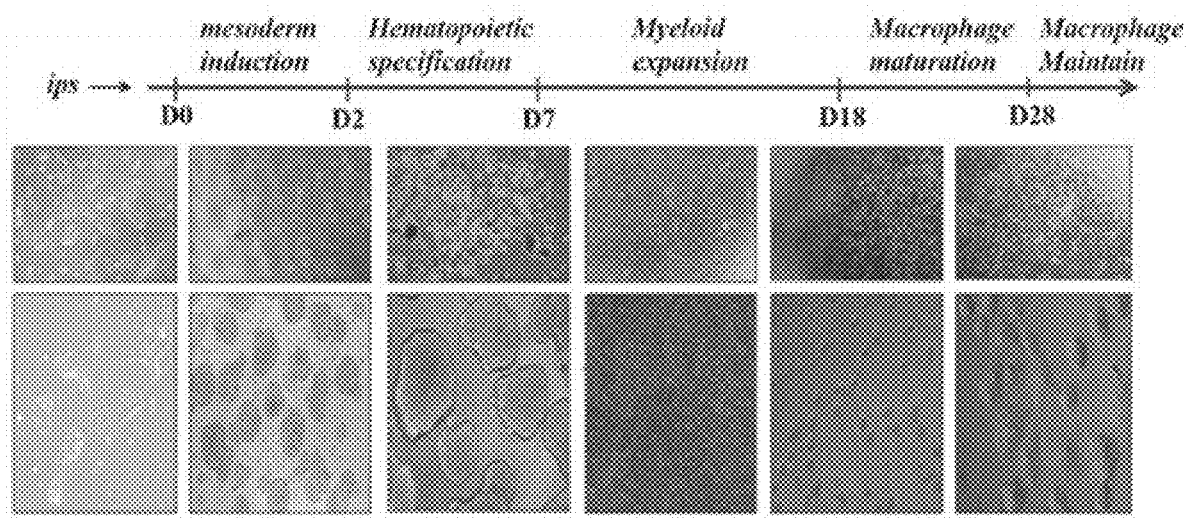
FIG. 1 shows macrophages differentiated from human induced pluripotent stem cells.

The technical solutions of the present disclosure will be clearly and comprehensively described below with reference to embodiments, but clearly, the described embodiments are merely some of the embodiments of the present disclosure, but not all the embodiments. Any other embodiments, obtained by a person ordinarily skilled in the art without using any creative efforts based on the embodiments in the present disclosure, shall fall within the scope of protection of the present disclosure.

According to an aspect of the present disclosure, the present disclosure provides a chimeric antigen receptor. The chimeric antigen receptor (CAR) is mainly composed of three portions, namely an extracellular domain, a transmembrane region, and an intracellular domain. The extracellular domain is a region for the extracellular binding of the chimeric antigen receptor to antigens, has the function of specific recognition and binding of tumor specific antigens/associated antigens, and imparts antigen-dependent phagocytosis to cells expressing the chimeric antigen receptor; the transmembrane region generally consists of the immunoglobulin superfamily; and the intracellular domain is a region for intracellular signal transduction. After that immune cells loaded with the chimeric antigen receptor bind to tumor cell surface antigens, an extracellular antigen-binding region will transmit signals to an intracellular signal activation region, so as to initiate the immune cell activation reaction.

The chimeric antigen receptor provided in the present disclosure contains an IFN-γ receptor, which is located in the intracellular domain of the chimeric antigen receptor and can enhance immune cells expressing the chimeric antigen receptor. In the present disclosure, an IFN-γ R sequence is constructed in an intracellular sequence of the chimeric antigen receptor, so as to enhance the response of immune cells expressing the chimeric antigen receptor to IFN-γ. When macrophages are used to express the chimeric antigen receptor provided in the present disclosure, the response of macrophages to IFN-γ can be enhanced, and the M1 activity of macrophages after the binding of tumor cell antigens to the chimeric antigen receptor is enhanced.

The concept of the chimeric antigen receptor provided in the present disclosure lies in providing an IFN-γ receptor in the intracellular domain of the chimeric antigen receptor, so as to enhance the response capability of cells to IFN-γ. Thus, it may be understandable that other structural portions in the chimeric antigen receptor are not specifically limited in the present disclosure, and other domains of the chimeric antigen receptor can be provided according to the general design principles of the chimeric antigen receptor in this field.

The extracellular domain of the chimeric antigen receptor is a region for the extracellular binding of the chimeric antigen receptor to antigens and imparts antigen-dependent immunization to immune cells. The extracellular domain of the chimeric antigen receptor contains, but is not limited to, scFv, Fab, scFab, or scIgG antibody fragments, so as to recognize and bind tumor specific antigens/associated antigens; and antigens recognized by the extracellular domain include, but are not limited to, any one from the group consisting of following antigens: mesothelin, CD1, CD1a, CD2, CD3, CD4, CD5, CD8, CD11A, CD14, CD15, CD16, CD18, CD19, CD21, CD20, CD22, CD23, CD25, CD29, CD30, CD32b, CD33, CD37, CD38, CD40, CD40L, CD44, CD45, CD46, CD52, CD54, CD55, CD59, CD64, CD66a-e, CD67, CD70, CD70L, CD74, CD79a, CD79b, CD80, CD83, CD95, CD126, CD132, CD133, CD138, CD147, CD154, CDC27, GD2, CCL19, CCL21, CDK-4/m, CDKN2A, CTLA4, CXCR4, CXCR7, CXCL12, HER2, CAIX, CD171, LMP1, EGFR, Muc1, GPC3, EphA2, EpCAM, MG7, CSR, ART-4, B7, Ba 733, BAGE, HIF-1α, CEA (CEACAM-5), CEACAM-6, c-Met, DAM, EGFRvlll, EGP-1 (TROP-2), EGP-2, ELF2-M, Ep-CAM, BrE3 antigen, CA125, CAMEL, CAP-1, IL-4R, IL-6R, IL-13R, IL-15R, IL-17R, IL-18R, IL-2, IL-6, IL-8, IL-12, IL-15, IL-17, IL-18, IL-23, IL-25, PSA, PRAME, PSMA, PIGF, ILGF, ILGF-1R, IL-6, IL-25, RS5, RANTES, T101, SAGE, S100, α-fetoprotein (AFP), a-actinin-4, A3, antigen having specificity against A33 antibody, carbonic anhydrase IX, CASP-8/m, colon specific antigen p(CSAp), fibroblast growth factor (FGF), Flt-1, Flt-3, folate receptor, G250 antigen, GAGE, gp100, GRO-B, HLA-DR, HM1.24, human chorionic gonadotropin (HCG) and its subunits, HMGB-1, hypoxia-inducible factor (HIF-1), HSP70-2M, HST-2, Ia, IGF-1R, IFN-γ, IFN-α, IFN-β, IFN-λ, insulin-like growth factor 1 (IGF-1), KC4 antigen, KS-1 antigen, KS1-4, Le-Y, LDR/FUT, macrophage migration inhibitory factor (MIF), MAGE, MAGE-3, MART1, MART-2, NY-ESO-1, TRAG-3, mCRP, MCP-1, MIP-1A, MIP-1B, MIF, MUC2, MUC3, MUC4, MUC5ac, MUC13, MUC16, MUM-1/2, MUM-3, NCA66, NCA95, NCA90, pancreatic cancer mucoprotein, PD1 receptor, placental growth factor, p53, PLAGL2, prostatic acid phosphatase, survivin, survivin-2B, TAC, TAG-72, tenascin, TRAIL receptor, TNF-α, Tn antigen, Thomson Friedenreich antigen, tumor necrosis antigen, VEGFR, ED-B fibronectin, WT-1, 17-1A antigen, complement factors C3, C3a, C3b, C5a, C5, angiogenesis marker, bc1-2, bc1-6, Kras, oncogene markers, and oncogene products.

In some optional embodiments, the extracellular domain of the chimeric antigen receptor recognizes mesothelin. Mesothelin are glycoproteins located on the cell membrane, and in physiological conditions, mesothelin are only expressed in mesothelial cells of an organism, but are expressed in many tumors. There are researches showing that mesothelin are expressed in ovarian cancer, pleural mesothelioma, pancreatic cancer, bile duct cancer and the like. Mesothelin play an important role in the process of promoting tumor formation and progression. In some optional embodiments, the extracellular domain of the chimeric antigen receptor contains a single-chain antibody targeting mesothelin (Mesothelin-scFv), and the amino acid sequence of Mesothelin-scFv is preferably shown by SEQ ID NO.5.

The intracellular domain for realizing signal transduction mainly contains a costimulatory domain and an intracellular activation region. In some preferred embodiments, the IFN-γ receptor is located in the intracellular activation region, and the amino acid sequence of the IFN-γ receptor is preferably shown by SEQ ID NO.2. The costimulatory domain can enhance receptor signals, and the costimulatory domain contains, but is not limited to, at least one of 4-1BB (CD137), CD80, CD86, and CD28, preferably contains 4-1BB, and the amino acid sequence of 4-1BB is shown by SEQ ID NO.3. The intracellular activation region contains e.g., but is not limited to, FcγRI or CD3ζ, and preferably contains CD3ζ, and the amino acid sequence of CD3ζ is preferably shown by SEQ ID NO.4.

The transmembrane region generally consists of the immunoglobulin superfamily, and the transmembrane region contains, but is not limited to, CD8 or CD28, and preferably contains CD8, e.g., contains CD8α, and the amino acid sequence of CD8α is shown by SEQ ID NO.6.

In addition to the extracellular domain, the transmembrane region, and the intracellular domain, the chimeric antigen receptor provided in the present disclosure may further contain domains of other functions, including, but not limited to, domains for hinge region or for marking the chimeric antigen receptor, such as reporter group or the like, which is not limited here in the present disclosure.

In some preferred embodiments, the chimeric antigen receptor is used for expression in macrophages, and the extracellular domain of the chimeric antigen receptor contains scFv targeting mesothelin (Mesothelin-scFv), so as to impart antigen-dependent phagocytosis to macrophages; the transmembrane region contains CD8α; the intracellular domain contains the costimulatory molecule 4-1BB, so as to be used for activating macrophages; and the intracellular activation region contains CD3ζ for enhancing the antitumor effect of macrophages and an IFN-γ receptor for promoting the M1 (antitumor) polarization of macrophages. The amino acid sequence of the chimeric antigen receptor is preferably shown by SEQ ID NO.1. The amino acid sequence of the chimeric antigen receptor may also be an amino acid sequence being at least 90% or more homologous with a sequence shown by SEQ ID NO.1, while making the chimeric antigen receptor and a chimeric antigen receptor encoded by the sequence as shown by SEQ ID NO.1 have the same function.

According to another aspect of the present disclosure, the present disclosure further provides a method for adjusting macrophage polarization, this method comprising: enabling macrophages to express the chimeric antigen receptor. Since the intracellular domain of the chimeric antigen receptor provided in the present disclosure contains IFN-γR, the response of macrophages expressing the chimeric antigen receptor to IFN-γ can be enhanced, so as to enhance the M1 activity of macrophages and promote the polarization of macrophages to M1 type.

According to another aspect of the present disclosure, the present disclosure further provides a macrophage expressing the chimeric antigen receptor as described above. Macrophages expressing the chimeric antigen receptor as described above are more efficient at being induced by IFN-γ so as to be transformed into M1 type, and accordingly, such macrophages kept in M1 type will simulate the activity of T cells after binding to tumor antigens, and the activated T cells can secrete more IFN-γ so as to induce macrophages to be transformed into M1 type. Secondly, after that macrophages of the chimeric antigen receptor containing IFN-γR bind to tumor antigens, macrophages will also be induced to exert the function of M1 macrophages. Accordingly, the capabilities thereof for tumor phagocytosis and antigen presentation are exerted to the maximum extent, so as to sufficiently adjust the tumor microenvironment, such that the immunosuppressive state of the tumor microenvironment is changed eventually.

In some preferred embodiments, the structure of the chimeric antigen receptor expressed by macrophages is as follows: The extracellular domain contains scFv targeting mesothelin; the transmembrane region contains CD8α; the intracellular domain contains the costimulatory molecule 4-1BB; and the intracellular activation region contains CD3ζ and an IFN-γ receptor. The amino acid sequence thereof is preferably a sequence as shown by SEQ ID NO.1, or an amino acid sequence being at least 90% or more homologous with the sequence shown by SEQ ID NO.1 and having the same function.

In some preferred embodiments, macrophages include macrophages derived from induction and differentiation of human induced pluripotent stem cells (hiPSC), or macrophages obtained through differentiation of human peripheral blood mononuclear cells (PBMC).

According to another aspect of the present disclosure, the present disclosure further provides a nucleic acid encoding the chimeric antigen receptor. The "nucleic acid" here in the present disclosure refers to the polymer form of nucleotides of any length, and nucleotides include ribonucleotides and/or deoxyribonucleotides. Examples for nucleic acid include, but are not limited to, single-chain, double-chain or multi-chain DNA or RNA, genomic DNA, cDNA, DNA-RNA heterozygotes, or polymers containing purine and pyrimidine bases or other natural, chemically or biochemically modified, unnatural or derived nucleotide bases. In addition to a region for encoding the chimeric antigen receptor, the nucleic acid may also contain other functional units, including, but not limited to, promoters, terminators, enhancers, restriction enzyme cutting sites or nucleotide sequences encoding marked regions, such as units encoding fluorescent proteins or resistance genes; and regions encoding vectors or the like.

According to another aspect of the present disclosure, the present disclosure further provides the use of the chimeric antigen receptor, the method for adjusting macrophage polarization, the macrophage expressing the chimeric antigen receptor, or the nucleic acid in the preparation of a product for tumor treatment. The use may be a use for preparing a product having a therapeutic effect on tumors, such as for preparing a reagent or a kit containing macrophages expressing the chimeric antigen receptor; may also be a use for preparing an intermediate product for tumor treatment, such as for preparing a vector containing a nucleic acid encoding the chimeric antigen receptor, such as plasmid or lentivirus, or recombinant microorganisms or cell lines for proliferating the above vector, etc.

According to another aspect of the present disclosure, the present disclosure further provides a product for tumor treatment, the product for tumor treatment may be for example, but is not limited to, a reagent or a kit containing macrophages expressing the chimeric antigen receptor; cells expressing the chimeric antigen receptor, or recombinant microorganisms or recombinant cell lines for replicating a nucleic acid encoding the chimeric antigen receptor; and a vector encoding the chimeric antigen receptor, such as plasmid vector or lentiviral vector or the like.

The use for preparing a product for tumor treatment according to the present disclosure or "tumor" as for the product for tumor treatment includes, but is not limited to: acute lymphoblastic leukemia, acute bone marrow-derived leukemia, bile duct cancer, breast cancer, cervical cancer, chronic lymphocytic leukemia, chronic bone marrow-derived leukemia, colorectal cancer, endometrial cancer, esophageal cancer, gastric cancer, head and neck cancer, Hodgkin's lymphoma, lung cancer, medullary thyroid cancer, non-Hodgkin's lymphoma, multiple myeloma, kidney cancer, ovarian cancer, pancreatic cancer, neuroglioma, melanoma, liver cancer, prostate cancer, and urinary tract bladder cancer and the like. Uses in different tumors can be realized by adjusting targeted antigens for binding an antigen region in the extracellular domain in the chimeric antigen receptor, and it is expected that a tumor of any type and a tumor antigen of any type can be targeted. It shall be clarified that a person skilled in the art could be convinced that in fact, tumor-associated antigens of any type are known.

The technical solutions and the beneficial effects of the present disclosure will be further illustrated below with reference to preferred examples and comparative examples.

A preparation method for macrophages used below is as follows.

(1) Macrophages differentiated from human induced pluripotent stem cells: The process for differentiating hiPSC into macrophages successively goes through formation of embryoid body (EB), hematopoietic stem and progenitor cells, myeloid progenitor cells, and mononuclear cells, and eventual formation of mononuclear macrophages. During the differentiation process of EB into hematopoietic stem cells, three growth factors, namely BMP4, bFGF, and VEGF, are added to stimulate and induce the differentiation; during the differentiation process of the hematopoietic stem cells into myeloid cells, three cell factors, namely IL-3, M-CSF, and GM-CSF, are added; and the cell factor GM-CSF is added for the differentiation of the myeloid cells into mononuclear macrophages, and then mature macrophages are obtained eventually, as shown in FIG. 1.

Figure 2:
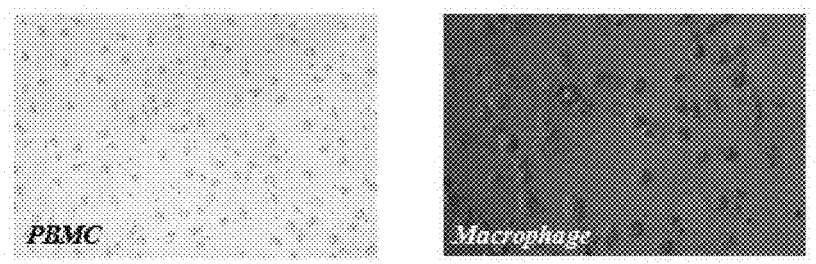
FIG. 2 shows macrophages obtained through induction and differentiation of human peripheral blood mononuclear cells.

(2) Macrophages obtained through induction and differentiation of human peripheral blood mononuclear cells (PBMC): peripheral blood mononuclear cells are obtained through density gradient centrifugation, every 2×10$^6$ PBMC are resuspended and then cultivated with RPMI 1640 containing 10% fetal bovine serum of GM-CSF in a final concentration of 100 ng/ml, the medium is changed every other day, and anchorage-dependent macrophages are obtained after cultivation for 5-7 days, as shown in FIG. 2.

Example 1

(I) Constructing a Chimeric Antigen Receptor Targeting Mesothelin Antigen

All sequences containing a single-chain antibody fragment targeting mesothelin Mesothelin-scFv, a CD8 transmembrane region, the costimulatory molecule 4-1BB, CD3ζ, and an IFN-γ receptor were integrated to lentiviral vector plasmids. The recombinant lentiviral vector plasmid comprises an EF-1a promoter sequence, a mesothelin single-chain antibody (scFv), a CD8 transmembrane region, a 4-1BB costimulatory molecule region, a CD3ζ activation region, and an IFN-γ receptor sequence.

The third-generation lentiviral plasmid comprises an ampicillin resistance gene AmpR sequence, a prokaryotic replicon pUC Ori sequence, a PGK promoter, lentivirus 5' LTR, lentivirus 3' LTR, an RRE cis element, a cPPT cis element, and an eWPRE enhanced marmot hepatitis B virus posttranscriptional regulatory element.

(II) Constructing Expression

By utilizing lentivirus packaging plasmids, an exogenous gene, namely a chimeric antigen receptor sequence, was integrated to a lentiviral vector. Integrated lentiviruses were overexpressed by utilizing 293T cells, the viruses were collected, macrophages were further infected, and positive cells were then screened by puromycin, hereby establishing a stably transfected cell strain and obtaining macrophages expressing the chimeric antigen receptor. The macrophages were marked by utilizing a mesothelin flow antibody, and the expression of macrophages of the chimeric antigen receptor was detected through flow cytometry.

Comparative Example 1

The present comparative example is different from Example 1 in that the chimeric antigen receptor does not contain IFN-γR and the amino acid sequence thereof is shown by SEQ ID NO.7.

Effect Example

The two kinds of macrophages of chimeric antigen receptor from the above example and comparative example were stimulated by utilizing IFN-γ, the polarization change states of macrophages to M1 of the both after IFN-γ stimulation were compared.

The two kinds of macrophages stimulated by IFN-γ were co-cultivated with tumor cells (ovarian cancer cell lines HO8910 and OVCAR3), the E/T ratio (MOI) was 1:1, 3:1, or 5:1, macrophages were marked by CD68/CD11b or iNOS, while tumor cells were marked by mesothelin, and the secretion and the expression of macrophage-associated proinflammatory factors and chemokines were detected by utilizing qPCR and ELISA.

(i) The two kinds of chimeric antigen receptors, namely T-CAR (not containing IFN-γR) and IFN-γR-T-CAR viruses (virus titer of $6 \times 10^8$ TU/mL) were transfected to macrophages from two sources (macrophages from induction and differentiation of hiPSC and primary macrophages derived from PBMC); the macrophages were transfected (cell quantity of $2 \times 10^6$ cells/mL); and since the virus plasmid contains GFP green fluorescent protein, the expression of green fluorescence on the surface of the macrophages were observed in 48-96 hours after transfection, and macrophages successfully expressing CAR molecules were obtained then through screening by a drug of puromycin. After that the macrophages ($1 \times 10^6$ cells/mL) have been stimulated for 24 hours by utilizing IFN-γ (in a concentration of 100 ng/ml), the qPCR results showed that compared with macrophages without IFN-γR, macrophages containing IFN-γR showed a significant increase in the expression of M1 markers, such as chemokines CCL2, CCR7, CCL8, and CXCL9, after IFN-γ stimulation.

Figure 3:
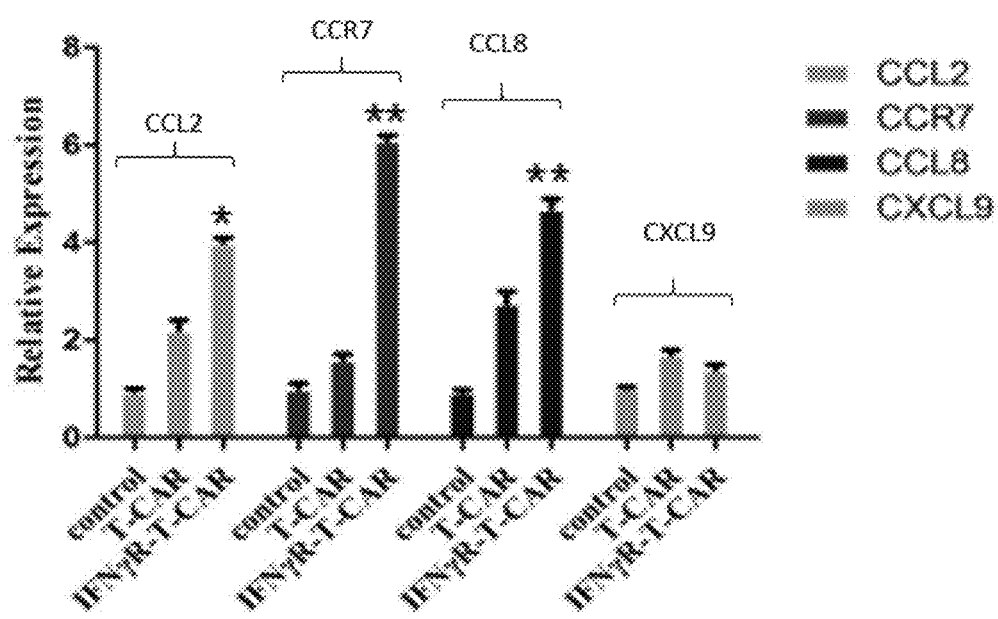
FIG. 3 shows responses of T-CAR macrophages and IFN-γR-T-CAR macrophages to IFN-γ stimulation, with macrophages not expressing CAR as a blank control group.
Figure 4:
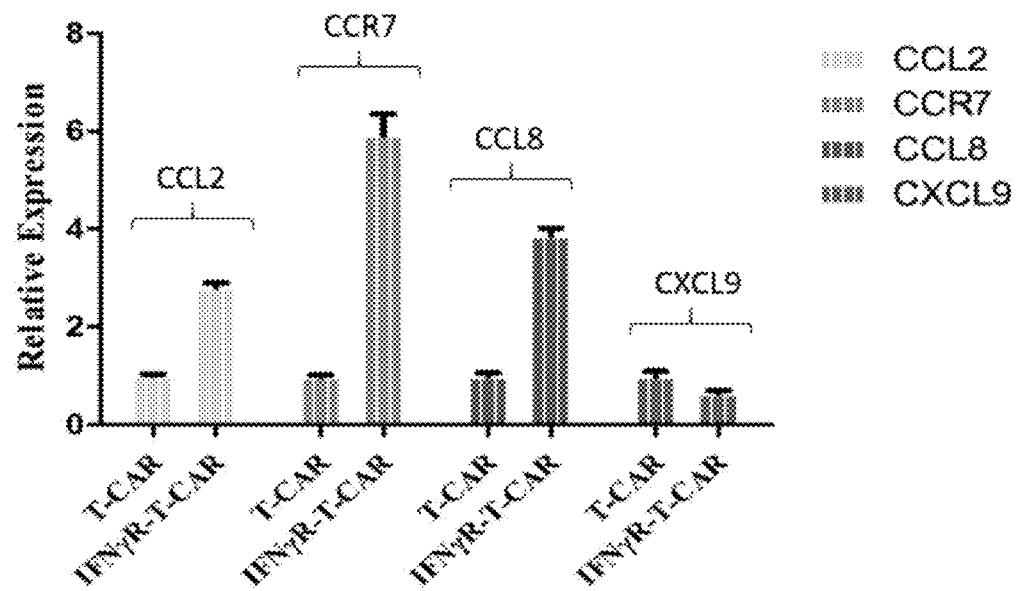
FIG. 4 shows the comparison only between the responses of T-CAR macrophages and IFN-γR-T-CAR macrophages to IFN-γ stimulation.

The experimental results are shown in FIGS. 3 and 4. It is shown in FIG. 3: macrophages not expressing CAR were used as a blank control group (control group), the responses of the T-CAR macrophages (not containing IFN-γR) and the IFN-γR-T-CAR macrophages to IFN-γ stimulation were both increased to different degrees, wherein the M1 markers were significantly increased (p<0.05), after that the IFN-γR-T-CAR macrophages have received IFN-γ stimulation; it is shown in FIG. 4: only the response degrees of the T-CAR macrophages (not containing IFN-γR) and the IFN-γR-T-CAR macrophages to IFN-γ stimulation were compared, and the results showed that compared with the T-CAR macrophages (not containing IFN-γR), the expression of M1 macrophage marker antigens was increased, after that the IFN-γR-T-CAR macrophages have received IFN-γ stimulation.

Figure 5:
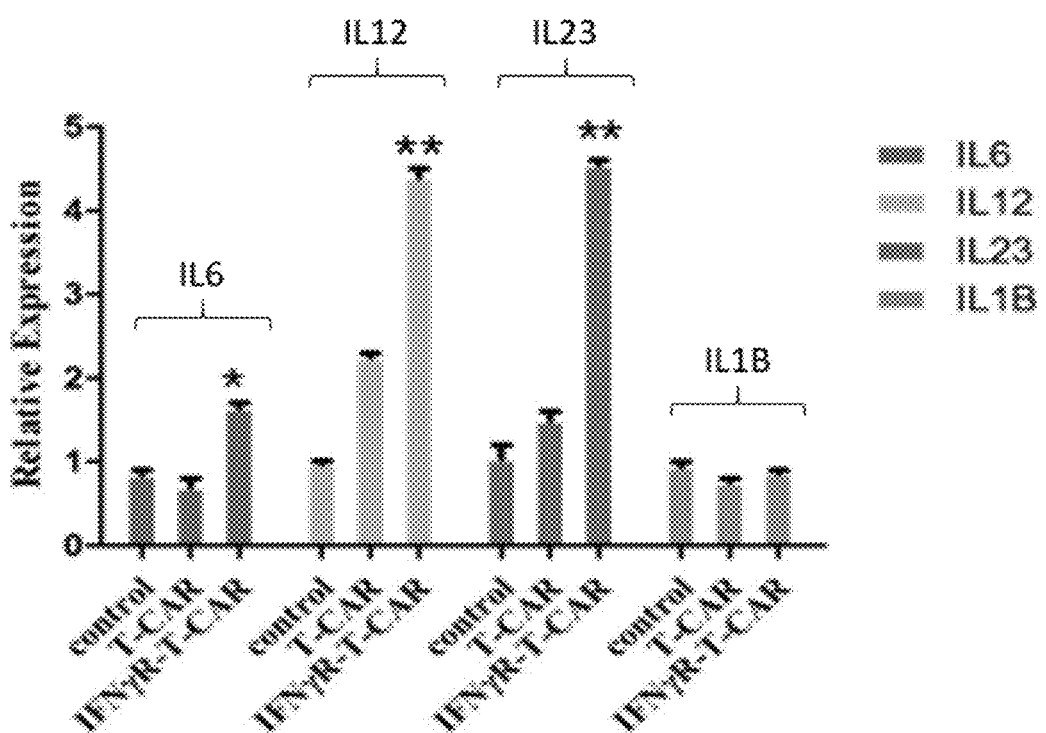
FIG. 5 shows expressions of M1 proinflammatory factors in T-CAR macrophages and IFN-γR-T-CAR macrophages, with macrophages not expressing CAR as a blank control group.
Figure 6:
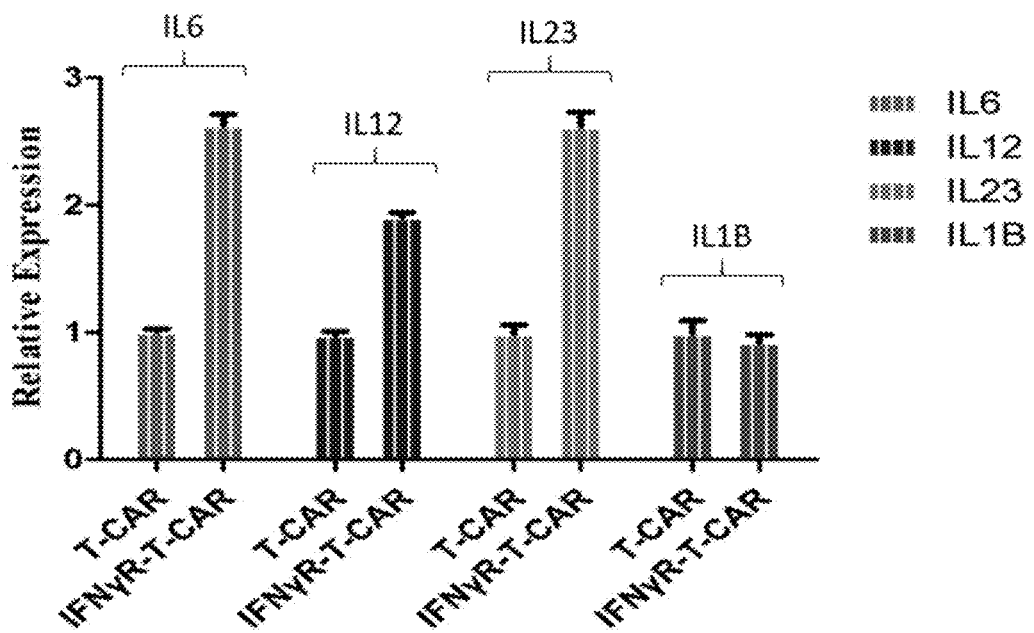
FIG. 6 shows the comparison only between the expressions of M1 proinflammatory factors in T-CAR macrophages and IFN-γR-T-CAR macrophages.

(ii) The two macrophages of chimeric antigen receptor, after being induced by IFN-γ, were co-cultivated in vitro with tumor cells (ovarian cancer cell lines HO8910) for 48 hours, and were detected by utilizing qPCR. The results showed that compared with macrophages without IFN-γR, the expression and the secretion of M1 proinflammatory factors IL-6, IL-12, IL-23, and IL-1B were detected, after that macrophages containing IFN-γR were firstly stimulated by IFN-γ and then co-cultivated with tumor cells. The experimental results are shown in FIGS. 5 and 6. It is shown in FIG. 5: macrophages not expressing CAR were used as a blank control group (control group), the expression of M1 proinflammatory factors of the IFN-γR-T-CAR macrophages was increased significantly (p<0.05), after that the T-CAR macrophages (not containing IFN-γR) and the IFN-γR-T-CAR macrophages have been stimulated by IFN-γ and then contacted with tumor cells for 48 hours; it is shown in FIG. 6: only the circumstances were compared, in which the T-CAR macrophages (not containing IFN-γR) and the IFN-γR-T-CAR macrophages were stimulated by IFN-γ and then contacted with tumor cells for 48 hours, and the results showed that compared with the T-CAR macrophages (not containing IFN-γR), the expression of M1 proinflammatory factors of the IFN-γR-T-CAR macrophages was increased significantly. The results indicated that after receiving IFN-γ stimulation, since the shown phenotypes of M1 macrophages are different, and then being co-cultivated with tumor cells, the two chimeric antigen receptors have a more significant proinflammatory function (which is embodied in the increase in the expression of M1 proinflammatory factors).

Figure 7:
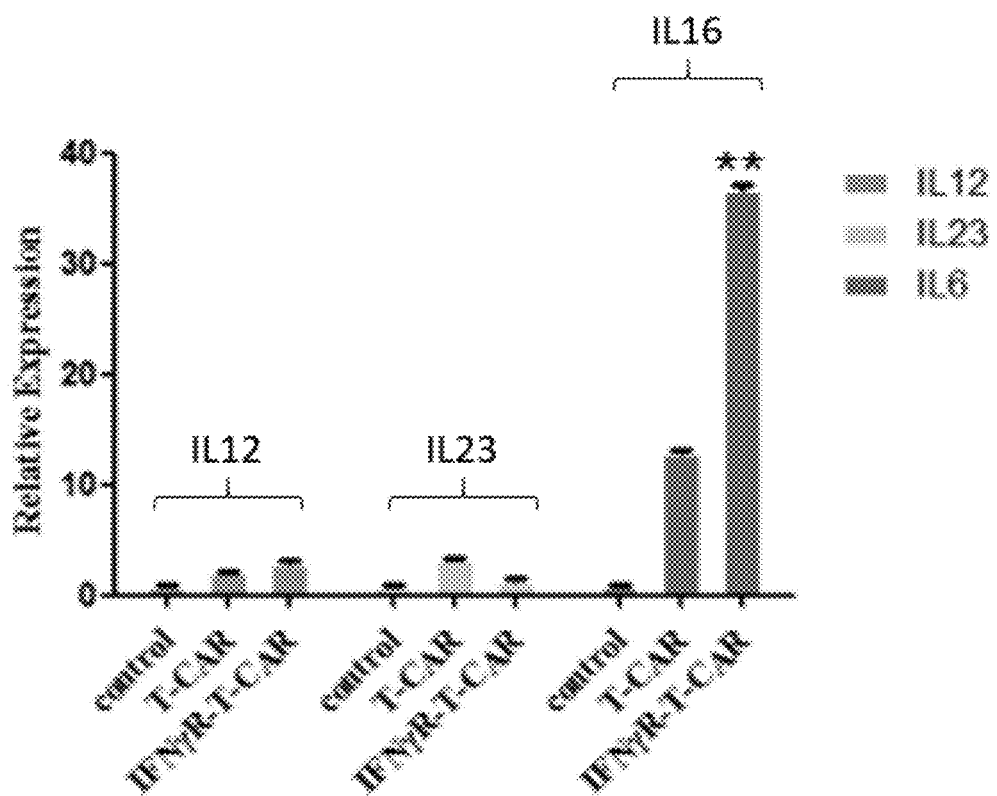
FIG. 7 shows polarization response degrees of T-CAR macrophages and IFN-γ R-T-CAR macrophages against tumor antigen stimulation, with macrophages not expressing CAR as a blank control group.
Figure 8:
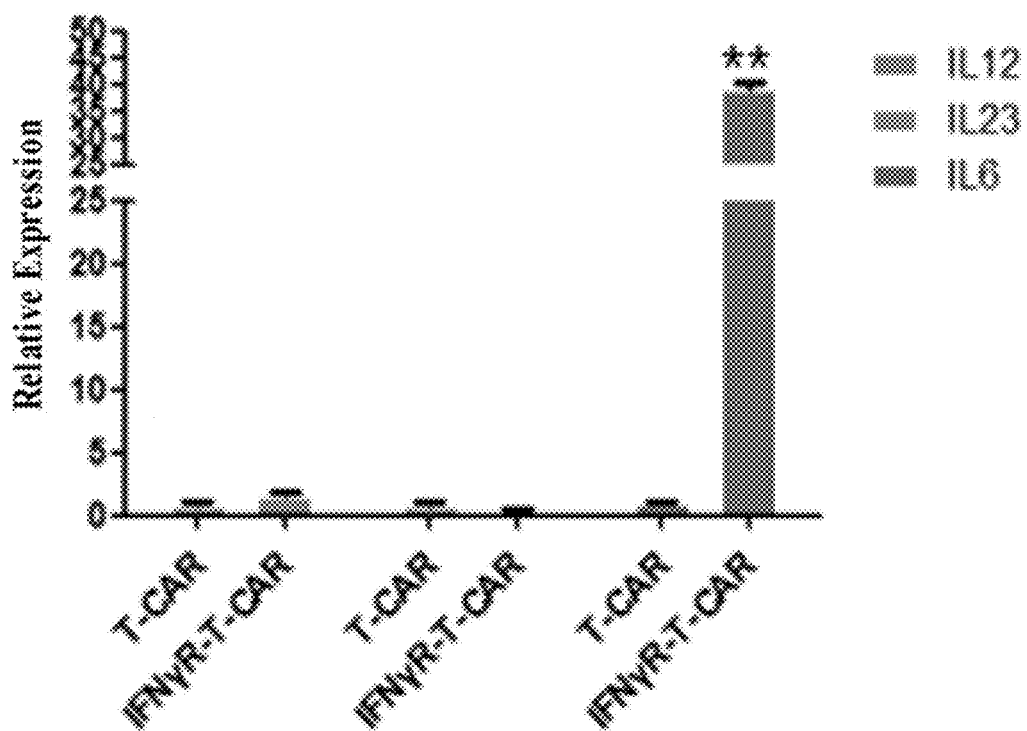
FIG. 8 shows the comparison only between the polarization response degrees of T-CAR macrophages and IFN-γR-T-CAR macrophages against tumor antigen stimulation.

(iii) The two kinds of macrophages were co-cultivated with tumor cells (ovarian cancer cell lines HO8910), and changes in macrophage polarization states were observed after the activation of the chimeric antigen receptor by tumor antigens. The results showed that compared with macrophages without IFN-γR, the expression of M1 proinflammatory factors was significantly increased after macrophages containing IFN-γR have been co-cultivated with tumor cells. The experimental results are shown in FIGS. 7 and 8. It is shown in FIG. 7: macrophages not expressing CAR were used as a blank control group (control group), the T-CAR macrophages (not containing IFN-γR) and the IFN-γR-T-CAR macrophages had different degrees of response to polarization occurring because of tumor antigen stimulation, wherein the M1 marker IL-6 was significantly increased (p<0.05), after that the IFN-γR-T-CAR macrophages have received tumor antigen stimulation; it is shown in FIG. 8: only the degrees of polarization changes of the T-CAR macrophages (not containing IFN-γR) and the IFN-γR-T-CAR macrophages to tumor antigen stimulation were compared, and the results showed that compared with the T-CAR macrophages (not containing IFN-γR), the expressions of M1 proinflammatory factors IL-6 and IL-12 were increased, after that the IFN-γR-T-CAR macrophages have received tumor antigen stimulation.

At last, it shall be clarified that the above respective embodiments are merely used to illustrate the technical solutions of the present disclosure, rather than limiting the same; although the present disclosure is illustrated in detail referring to the preceding respective embodiments, it should be understandable for a person ordinarily skilled in the art that modifications may still be made to the technical solutions recorded in the preceding respective embodiments, or partial or all technical features therein may be substituted with equivalents; and these modifications or substitutions do not make the essence of the respective technical solutions depart from the scope of the technical solutions of the respective embodiments of the present disclosure.

The invention claimed is:

1. A chimeric antigen receptor, wherein an extracellular domain of the chimeric antigen receptor contains scFv targeting mesothelin; a transmembrane region contains CD8α; and an intracellular domain contains a costimulatory molecule 4-1BB, CD3ζ, and IFN-γ receptor; and
an amino acid sequence of the chimeric antigen receptor is shown by SEQ ID NO.1, or shown by a sequence that is at least 90% or more identical homologous with the sequence shown by SEQ ID NO.1.

2. A method for adjusting macrophage polarization, wherein the method comprises: enabling macrophages to express the chimeric antigen receptor according to claim 1, the method comprising providing the macrophages with the chimeric antigen receptor according to claim 1.

3. A macrophage expressing the chimeric antigen receptor according to claim 1;
wherein, the macrophage comprises a macrophage derived from induction and differentiation of human induced pluripotent stem cells, or a macrophage obtained through differentiation of human peripheral blood mononuclear cells, wherein the macrophage is not present in a human body.

* * * * *

SEQUENCE LISTING

```
<160> NUMBER OF SEQ ID NOS: 7

<210> SEQ ID NO 1
<211> LENGTH: 706
<212> TYPE: PRT
<213> ORGANISM: Artificial Sequence
<220> FEATURE:
<223> OTHER INFORMATION: Amino acid sequence of the chimeric antigen
      receptor

<400> SEQUENCE: 1

Met Ala Leu Pro Val Thr Ala Leu Leu Leu Pro Leu Ala Leu Leu Leu
1               5                   10                  15

His Ala Ala Arg Pro Gln Val Gln Leu Gln Gln Ser Gly Pro Glu Leu
                20                  25                  30

Glu Lys Pro Gly Ala Ser Val Lys Ile Ser Cys Lys Ala Ser Gly Tyr
            35                  40                  45

Ser Phe Thr Gly Tyr Thr Met Asn Trp Val Lys Gln Ser His Gly Lys
    50                  55                  60

Ser Leu Glu Trp Ile Gly Leu Ile Thr Pro Tyr Asn Gly Ala Ser Ser
65                  70                  75                  80

Tyr Asn Gln Lys Phe Arg Gly Lys Ala Thr Leu Thr Val Asp Lys Ser
                85                  90                  95

Ser Ser Thr Ala Tyr Met Asp Leu Leu Ser Leu Thr Ser Glu Asp Ser
            100                 105                 110

Ala Val Tyr Phe Cys Ala Arg Gly Gly Tyr Asp Gly Arg Gly Phe Asp
        115                 120                 125

Tyr Trp Gly Gln Gly Thr Thr Val Thr Val Ser Ser Gly Gly Gly Gly
    130                 135                 140

Ser Gly Gly Gly Gly Ser Gly Gly Gly Gly Ser Asp Ile Glu Leu Thr
145                 150                 155                 160

Gln Ser Pro Ala Ile Met Ser Ala Ser Pro Gly Glu Lys Val Thr Met
                165                 170                 175

Thr Cys Ser Ala Ser Ser Ser Val Ser Tyr Met His Trp Tyr Gln Gln
            180                 185                 190

Lys Ser Gly Thr Ser Pro Lys Arg Trp Ile Tyr Asp Thr Ser Lys Leu
        195                 200                 205

Ala Ser Gly Val Pro Gly Arg Phe Ser Gly Ser Gly Ser Gly Asn Ser
    210                 215                 220

Tyr Ser Leu Thr Ile Ser Ser Val Glu Ala Glu Asp Asp Ala Thr Tyr
225                 230                 235                 240

Tyr Cys Gln Gln Trp Ser Gly Tyr Pro Leu Thr Phe Gly Ala Gly Thr
                245                 250                 255

Lys Leu Glu Ile Thr Thr Thr Pro Ala Pro Arg Pro Pro Thr Pro Ala
            260                 265                 270

Pro Thr Ile Ala Ser Gln Pro Leu Ser Leu Arg Pro Glu Ala Cys Arg
        275                 280                 285
```

-continued

```
Pro Ala Gly Gly Ala Val His Thr Arg Gly Leu Asp Phe Ala Cys
    290                 295                 300

Asp Ile Tyr Ile Trp Ala Pro Leu Ala Gly Thr Cys Gly Val Leu Leu
305                 310                 315                 320

Leu Ser Leu Val Ile Thr Leu Tyr Cys Lys Arg Gly Arg Lys Lys Leu
                325                 330                 335

Leu Tyr Ile Phe Lys Gln Pro Phe Met Arg Pro Val Gln Thr Thr Gln
                340                 345                 350

Glu Glu Asp Gly Cys Ser Cys Arg Phe Pro Glu Glu Glu Glu Gly Gly
                355                 360                 365

Cys Glu Leu Arg Val Lys Phe Ser Arg Ser Ala Asp Ala Pro Ala Tyr
370                 375                 380

Lys Gln Gly Gln Asn Gln Leu Tyr Asn Glu Leu Asn Leu Gly Arg Arg
385                 390                 395                 400

Glu Glu Tyr Asp Val Leu Asp Lys Arg Arg Gly Arg Asp Pro Glu Met
                405                 410                 415

Gly Gly Lys Pro Arg Arg Lys Asn Pro Gln Glu Gly Leu Tyr Asn Glu
                420                 425                 430

Leu Gln Lys Asp Lys Met Ala Glu Ala Tyr Ser Glu Ile Gly Met Lys
                435                 440                 445

Gly Glu Arg Arg Arg Gly Lys Gly His Asp Gly Leu Tyr Gln Gly Leu
450                 455                 460

Ser Thr Ala Thr Lys Asp Thr Tyr Asp Ala Leu His Met Gln Ala Leu
465                 470                 475                 480

Pro Pro Arg Cys Phe Tyr Ile Lys Lys Ile Asn Pro Leu Lys Glu Lys
                485                 490                 495

Ser Ile Ile Leu Pro Lys Ser Leu Ile Ser Val Val Arg Ser Ala Thr
                500                 505                 510

Leu Glu Thr Lys Pro Glu Ser Lys Tyr Val Ser Leu Ile Thr Ser Tyr
                515                 520                 525

Gln Pro Phe Ser Leu Glu Lys Glu Val Val Cys Glu Glu Pro Leu Ser
                530                 535                 540

Pro Ala Thr Val Pro Gly Met His Thr Glu Asp Asn Pro Gly Lys Val
545                 550                 555                 560

Glu His Thr Glu Glu Leu Ser Ser Ile Thr Glu Val Val Thr Thr Glu
                565                 570                 575

Glu Asn Ile Pro Asp Val Val Pro Gly Ser His Leu Thr Pro Ile Glu
                580                 585                 590

Arg Glu Ser Ser Ser Pro Leu Ser Ser Asn Gln Ser Glu Pro Gly Ser
                595                 600                 605

Ile Ala Leu Asn Ser Tyr His Ser Arg Asn Cys Ser Glu Ser Asp His
610                 615                 620

Ser Arg Asn Gly Phe Asp Thr Asp Ser Ser Cys Leu Glu Ser His Ser
625                 630                 635                 640

Ser Leu Ser Asp Ser Glu Phe Pro Pro Asn Asn Lys Gly Glu Ile Lys
                645                 650                 655

Thr Glu Gly Gln Glu Leu Ile Thr Val Ile Lys Ala Pro Thr Ser Phe
                660                 665                 670

Gly Tyr Asp Lys Pro His Val Leu Val Asp Leu Leu Val Asp Asp Ser
                675                 680                 685

Gly Lys Glu Ser Leu Ile Gly Tyr Arg Pro Thr Glu Asp Ser Lys Glu
690                 695                 700

Phe Ser
```

-continued

<210> SEQ ID NO 2
<211> LENGTH: 223
<212> TYPE: PRT
<213> ORGANISM: Artificial Sequence
<220> FEATURE:
<223> OTHER INFORMATION: Amino acid sequence of the IFN- receptor

<400> SEQUENCE: 2

Cys Phe Tyr Ile Lys Lys Ile Asn Pro Leu Lys Glu Lys Ser Ile Ile
1               5                   10                  15

Leu Pro Lys Ser Leu Ile Ser Val Val Arg Ser Ala Thr Leu Glu Thr
            20                  25                  30

Lys Pro Glu Ser Lys Tyr Val Ser Leu Ile Thr Ser Tyr Gln Pro Phe
        35                  40                  45

Ser Leu Glu Lys Glu Val Val Cys Glu Glu Pro Leu Ser Pro Ala Thr
    50                  55                  60

Val Pro Gly Met His Thr Glu Asp Asn Pro Gly Lys Val Glu His Thr
65                  70                  75                  80

Glu Glu Leu Ser Ser Ile Thr Glu Val Val Thr Thr Glu Glu Asn Ile
                85                  90                  95

Pro Asp Val Val Pro Gly Ser His Leu Thr Pro Ile Glu Arg Glu Ser
            100                 105                 110

Ser Ser Pro Leu Ser Ser Asn Gln Ser Glu Pro Gly Ser Ile Ala Leu
        115                 120                 125

Asn Ser Tyr His Ser Arg Asn Cys Ser Glu Ser Asp His Ser Arg Asn
    130                 135                 140

Gly Phe Asp Thr Asp Ser Ser Cys Leu Glu Ser His Ser Ser Leu Ser
145                 150                 155                 160

Asp Ser Glu Phe Pro Pro Asn Asn Lys Gly Glu Ile Lys Thr Glu Gly
                165                 170                 175

Gln Glu Leu Ile Thr Val Ile Lys Ala Pro Thr Ser Phe Gly Tyr Asp
            180                 185                 190

Lys Pro His Val Leu Val Asp Leu Leu Val Asp Asp Ser Gly Lys Glu
        195                 200                 205

Ser Leu Ile Gly Tyr Arg Pro Thr Glu Asp Ser Lys Glu Phe Ser
    210                 215                 220

<210> SEQ ID NO 3
<211> LENGTH: 42
<212> TYPE: PRT
<213> ORGANISM: Artificial Sequence
<220> FEATURE:
<223> OTHER INFORMATION: Amino acid sequence of 4-1BB

<400> SEQUENCE: 3

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40

<210> SEQ ID NO 4
<211> LENGTH: 112
<212> TYPE: PRT
<213> ORGANISM: Artificial Sequence
<220> FEATURE:

-continued

<223> OTHER INFORMATION: Amino acid sequence of CD3

<400> SEQUENCE: 4

```
Arg Val Lys Phe Ser Arg Ser Ala Asp Ala Pro Ala Tyr Lys Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110
```

<210> SEQ ID NO 5
<211> LENGTH: 305
<212> TYPE: PRT
<213> ORGANISM: Artificial Sequence
<220> FEATURE:
<223> OTHER INFORMATION: Amino acid sequence of the scFv targeting mesothelin

<400> SEQUENCE: 5

```
Met Ala Leu Pro Val Thr Ala Leu Leu Leu Pro Leu Ala Leu Leu Leu
1               5                   10                  15

His Ala Ala Arg Pro Gln Val Gln Leu Gln Gln Ser Gly Pro Glu Leu
            20                  25                  30

Glu Lys Pro Gly Ala Ser Val Lys Ile Ser Cys Lys Ala Ser Gly Tyr
        35                  40                  45

Ser Phe Thr Gly Tyr Thr Met Asn Trp Val Lys Gln Ser His Gly Lys
    50                  55                  60

Ser Leu Glu Trp Ile Gly Leu Ile Thr Pro Tyr Asn Gly Ala Ser Ser
65                  70                  75                  80

Tyr Asn Gln Lys Phe Arg Gly Lys Ala Thr Leu Thr Val Asp Lys Ser
                85                  90                  95

Ser Ser Thr Ala Tyr Met Asp Leu Leu Ser Leu Thr Ser Glu Asp Ser
            100                 105                 110

Ala Val Tyr Phe Cys Ala Arg Gly Gly Tyr Asp Gly Arg Gly Phe Asp
        115                 120                 125

Tyr Trp Gly Gln Gly Thr Thr Val Thr Val Ser Ser Gly Gly Gly Gly
    130                 135                 140

Ser Gly Gly Gly Gly Ser Gly Gly Gly Gly Ser Asp Ile Glu Leu Thr
145                 150                 155                 160

Gln Ser Pro Ala Ile Met Ser Ala Ser Pro Gly Glu Lys Val Thr Met
                165                 170                 175

Thr Cys Ser Ala Ser Ser Ser Val Ser Tyr Met His Trp Tyr Gln Gln
            180                 185                 190

Lys Ser Gly Thr Ser Pro Lys Arg Trp Ile Tyr Asp Thr Ser Lys Leu
        195                 200                 205

Ala Ser Gly Val Pro Gly Arg Phe Ser Gly Ser Gly Ser Gly Asn Ser
    210                 215                 220

Tyr Ser Leu Thr Ile Ser Ser Val Glu Ala Glu Asp Asp Ala Thr Tyr
```

```
                225                 230                 235                 240

Tyr Cys Gln Gln Trp Ser Gly Tyr Pro Leu Thr Phe Gly Ala Gly Thr
                    245                 250                 255

Lys Leu Glu Ile Thr Thr Thr Pro Ala Pro Arg Pro Pro Thr Pro Ala
                260                 265                 270

Pro Thr Ile Ala Ser Gln Pro Leu Ser Leu Arg Pro Glu Ala Cys Arg
                275                 280                 285

Pro Ala Ala Gly Gly Ala Val His Thr Arg Gly Leu Asp Phe Ala Cys
            290                 295                 300

Asp
305

<210> SEQ ID NO 6
<211> LENGTH: 24
<212> TYPE: PRT
<213> ORGANISM: Artificial Sequence
<220> FEATURE:
<223> OTHER INFORMATION: Amino acid sequence of CD8

<400> SEQUENCE: 6

Ile Tyr Ile Trp Ala Pro Leu Ala Gly Thr Cys Gly Val Leu Leu Leu
1               5                   10                  15

Ser Leu Val Ile Thr Leu Tyr Cys
                20

<210> SEQ ID NO 7
<211> LENGTH: 483
<212> TYPE: PRT
<213> ORGANISM: Artificial Sequence
<220> FEATURE:
<223> OTHER INFORMATION: Amino acid sequence of chimeric antigen
      receptor not containing IFN-R

<400> SEQUENCE: 7

Met Ala Leu Pro Val Thr Ala Leu Leu Leu Pro Leu Ala Leu Leu Leu
1               5                   10                  15

His Ala Ala Arg Pro Gln Val Gln Leu Gln Gln Ser Gly Pro Glu Leu
                20                  25                  30

Glu Lys Pro Gly Ala Ser Val Lys Ile Ser Cys Lys Ala Ser Gly Tyr
            35                  40                  45

Ser Phe Thr Gly Tyr Thr Met Asn Trp Val Lys Gln Ser His Gly Lys
        50                  55                  60

Ser Leu Glu Trp Ile Gly Leu Ile Thr Pro Tyr Asn Gly Ala Ser Ser
65                  70                  75                  80

Tyr Asn Gln Lys Phe Arg Gly Lys Ala Thr Leu Thr Val Asp Lys Ser
                85                  90                  95

Ser Ser Thr Ala Tyr Met Asp Leu Leu Ser Leu Thr Ser Glu Asp Ser
                100                 105                 110

Ala Val Tyr Phe Cys Ala Arg Gly Gly Tyr Asp Gly Arg Gly Phe Asp
            115                 120                 125

Tyr Trp Gly Gln Gly Thr Thr Val Thr Val Ser Ser Gly Gly Gly Gly
        130                 135                 140

Ser Gly Gly Gly Gly Ser Gly Gly Gly Ser Asp Ile Glu Leu Thr
145                 150                 155                 160

Gln Ser Pro Ala Ile Met Ser Ala Ser Pro Gly Glu Lys Val Thr Met
                165                 170                 175

Thr Cys Ser Ala Ser Ser Ser Val Ser Tyr Met His Trp Tyr Gln Gln
                180                 185                 190
```

```
Lys Ser Gly Thr Ser Pro Lys Arg Trp Ile Tyr Asp Thr Ser Lys Leu
        195             200             205
Ala Ser Gly Val Pro Gly Arg Phe Ser Gly Ser Gly Ser Gly Asn Ser
        210             215             220
Tyr Ser Leu Thr Ile Ser Ser Val Glu Ala Glu Asp Ala Thr Tyr
225             230             235             240
Tyr Cys Gln Gln Trp Ser Gly Tyr Pro Leu Thr Phe Gly Ala Gly Thr
            245             250             255
Lys Leu Glu Ile Thr Thr Thr Pro Ala Pro Arg Pro Pro Thr Pro Ala
            260             265             270
Pro Thr Ile Ala Ser Gln Pro Leu Ser Leu Arg Pro Glu Ala Cys Arg
            275             280             285
Pro Ala Ala Gly Gly Ala Val His Thr Arg Gly Leu Asp Phe Ala Cys
        290             295             300
Asp Ile Tyr Ile Trp Ala Pro Leu Ala Gly Thr Cys Gly Val Leu Leu
305             310             315             320
Leu Ser Leu Val Ile Thr Leu Tyr Cys Lys Arg Gly Arg Lys Lys Leu
            325             330             335
Leu Tyr Ile Phe Lys Gln Pro Phe Met Arg Pro Val Gln Thr Thr Gln
            340             345             350
Glu Glu Asp Gly Cys Ser Cys Arg Phe Pro Glu Glu Glu Glu Gly Gly
            355             360             365
Cys Glu Leu Arg Val Lys Phe Ser Arg Ser Ala Asp Ala Pro Ala Tyr
        370             375             380
Lys Gln Gly Gln Asn Gln Leu Tyr Asn Glu Leu Asn Leu Gly Arg Arg
385             390             395             400
Glu Glu Tyr Asp Val Leu Asp Lys Arg Arg Gly Arg Asp Pro Glu Met
            405             410             415
Gly Gly Lys Pro Arg Arg Lys Asn Pro Gln Glu Gly Leu Tyr Asn Glu
            420             425             430
Leu Gln Lys Asp Lys Met Ala Glu Ala Tyr Ser Glu Ile Gly Met Lys
        435             440             445
Gly Glu Arg Arg Arg Gly Lys Gly His Asp Gly Leu Tyr Gln Gly Leu
    450             455             460
Ser Thr Ala Thr Lys Asp Thr Tyr Asp Ala Leu His Met Gln Ala Leu
465             470             475             480
Pro Pro Arg
```